United States Patent
Phillips

(10) Patent No.: US 10,259,707 B2
(45) Date of Patent: *Apr. 16, 2019

(54) METHODS AND SYSTEMS FOR PRODUCING HYDROGEN

(71) Applicant: H2 CATALYST, LLC, New York, NY (US)

(72) Inventor: Douglas Howard Phillips, Millerton, OK (US)

(*) Notice: Subject to any disclaimer, the term of this patent is extended or adjusted under 35 U.S.C. 154(b) by 119 days.

This patent is subject to a terminal disclaimer.

(21) Appl. No.: 14/822,627

(22) Filed: Aug. 10, 2015

(65) Prior Publication Data

US 2015/0344303 A1    Dec. 3, 2015

Related U.S. Application Data

(63) Continuation of application No. 14/235,022, filed on Jan. 24, 2014, now Pat. No. 9,102,529.

(51) Int. Cl.
| | |
|---|---|
| *H01M 4/02* | (2006.01) |
| *B01J 21/18* | (2006.01) |
| *C01B 3/08* | (2006.01) |
| *H01M 8/065* | (2016.01) |
| *H01M 8/0656* | (2016.01) |

(Continued)

(52) U.S. Cl.
CPC .......... *C01B 3/08* (2013.01); *B01J 7/02* (2013.01); *B01J 19/087* (2013.01); *H01M 8/065* (2013.01); *H01M 8/0656* (2013.01); *Y02E 60/36* (2013.01); *Y02E 60/50* (2013.01)

(58) Field of Classification Search
CPC ............ C25B 1/02; C25B 1/22; H01M 12/08
See application file for complete search history.

(56) References Cited

U.S. PATENT DOCUMENTS

| | | | |
|---|---|---|---|
| 4,217,191 A | 8/1980 | Jean-Michael | |
| 4,251,568 A * | 2/1981 | Hart ................. | H01M 10/365 429/105 |

(Continued)

FOREIGN PATENT DOCUMENTS

| | | |
|---|---|---|
| CN | 1469841 A | 1/2004 |
| CN | 101538077 A | 9/2009 |

(Continued)

OTHER PUBLICATIONS d'Hennezel et al. "Benzene and toluene gas-phase photocatalytic degradation over H2O and HCL pretreated TiO2: by-products and mechanisms" Journal of Photochemistry and Photobiology A: Chemistry 118 (1998) 197-204.*

(Continued)

*Primary Examiner* — Amber R Orlando
*Assistant Examiner* — Syed Iqbal
(74) *Attorney, Agent, or Firm* — Tarter Krinsky & Drogin LLP

(57) ABSTRACT

Exemplary embodiments of methods and systems for hydrogen production using an electro-activated material are provided. In some exemplary embodiments, carbon can be electro-activated and used in a chemical reaction with water and a fuel, such as aluminum, to generate hydrogen. Controlling the temperature of the reaction, and the amounts of water, aluminum and electro-activated carbon can provide hydrogen on demand at a desired rate of hydrogen generation.

18 Claims, 6 Drawing Sheets

(51) Int. Cl.
B01J 7/02 (2006.01)
B01J 19/08 (2006.01)

(56) References Cited

U.S. PATENT DOCUMENTS

| | | | |
|---|---|---|---|
| 4,304,643 A * | 12/1981 | Divisek | C25B 1/22 |
| | | | 205/554 |
| 4,340,580 A | 7/1982 | Suzuki | |
| 4,401,529 A | 8/1983 | Gray | |
| 4,425,203 A | 1/1984 | Gray | |
| 4,430,186 A | 2/1984 | Gray | |
| 4,466,868 A | 8/1984 | Gray | |
| 4,643,806 A | 2/1987 | Hegedus | |
| 5,650,132 A * | 7/1997 | Murata | C01B 3/26 |
| | | | 423/445 B |
| 5,728,464 A | 3/1998 | Checketts | |
| 5,817,157 A | 10/1998 | Checketts | |
| 6,328,821 B1 | 12/2001 | Ovshinsky | |
| 6,440,385 B1 | 8/2002 | Chaklader | |
| 6,458,189 B1 | 10/2002 | Edlund | |
| 6,537,352 B2 | 3/2003 | Edlund | |
| 6,562,111 B2 | 5/2003 | Edlund | |
| 6,569,227 B2 | 5/2003 | Edlund | |
| 6,582,676 B2 * | 6/2003 | Chaklader | C01B 3/08 |
| | | | 423/648.1 |
| 6,596,057 B2 | 7/2003 | Edlund | |
| 6,632,270 B2 | 10/2003 | Edlund | |
| 6,663,681 B2 | 12/2003 | Kindig | |
| 6,719,047 B2 | 4/2004 | Fowler | |
| 6,719,831 B2 | 4/2004 | Edlund | |
| 6,719,832 B2 | 4/2004 | Edlund | |
| 6,723,156 B2 | 4/2004 | Edlund | |
| 6,732,794 B2 | 5/2004 | Wellington | |
| 6,767,389 B2 | 7/2004 | Edlund | |
| 6,820,688 B2 | 11/2004 | Vinegar | |
| 6,824,593 B2 | 11/2004 | Edlund | |
| 6,834,508 B2 | 12/2004 | Bradley | |
| 6,834,623 B2 | 12/2004 | Cheng | |
| 6,846,584 B2 | 1/2005 | Dutil | |
| 6,860,923 B2 | 3/2005 | Myasnikov | |
| 6,886,609 B2 | 5/2005 | Cohen | |
| 6,918,430 B2 | 7/2005 | Myasnikov | |
| 6,923,258 B2 | 8/2005 | Wellington | |
| 6,948,563 B2 | 9/2005 | Wellington | |
| 6,953,497 B2 | 10/2005 | Edlund | |
| 6,986,258 B2 | 1/2006 | Bradley | |
| 6,991,719 B2 | 1/2006 | Ovshinsky | |
| 6,994,168 B2 | 2/2006 | Wellington | |
| 7,036,324 B2 | 5/2006 | Bradley | |
| 7,037,483 B2 | 5/2006 | Suzuki | |
| 7,052,530 B2 | 5/2006 | Edlund | |
| 7,093,626 B2 | 8/2006 | Li | |
| 7,101,421 B2 | 9/2006 | Edlund | |
| 7,108,777 B2 | 9/2006 | Xu | |
| 7,118,611 B2 | 10/2006 | Snow | |
| 7,144,567 B2 | 12/2006 | Andersen | |
| 7,175,751 B2 | 2/2007 | Venkatesan | |
| 7,195,663 B2 | 3/2007 | Edlund | |
| 7,198,867 B2 | 4/2007 | Sanders | |
| 7,297,183 B2 | 11/2007 | Edlund | |
| 7,357,912 B2 | 4/2008 | Sakai | |
| 7,363,965 B2 | 4/2008 | Myasnikov | |
| 7,393,440 B2 | 7/2008 | Ghosh | |
| 7,410,531 B2 | 8/2008 | Edlund | |
| 7,459,065 B2 | 12/2008 | Kelly | |
| 7,485,160 B2 | 2/2009 | Kitada | |
| 7,493,765 B2 | 2/2009 | Akiyama | |
| 7,497,191 B2 | 3/2009 | Fulton | |
| 7,534,275 B2 | 5/2009 | Tonca | |
| 7,601,308 B2 | 10/2009 | Austin | |
| 7,632,483 B2 | 12/2009 | Marion | |
| 7,641,889 B1 | 1/2010 | Salinas | |
| 7,651,554 B2 | 1/2010 | Tan | |
| 7,695,709 B2 | 4/2010 | Miki | |
| 7,704,369 B2 | 4/2010 | Olah | |
| 7,721,682 B2 | 5/2010 | Fulton | |
| 7,727,373 B2 | 6/2010 | Curtin | |
| 7,727,492 B2 | 6/2010 | Myasnikov | |
| 7,749,304 B2 | 7/2010 | Kool | |
| 7,771,612 B2 | 8/2010 | Sugita | |
| 7,789,941 B2 | 9/2010 | Edlund | |
| 7,819,955 B2 | 10/2010 | Edlund | |
| 7,833,473 B2 | 11/2010 | Zhao | |
| 7,879,310 B2 | 2/2011 | Spear | |
| 7,883,610 B2 | 2/2011 | Monzyk | |
| 7,896,950 B2 | 3/2011 | Xia | |
| 7,911,071 B2 | 3/2011 | Devine | |
| 7,938,879 B2 | 5/2011 | Woodall | |
| 7,947,096 B2 | 5/2011 | Tonca | |
| 7,951,349 B2 | 5/2011 | Kindler | |
| 7,955,491 B2 | 6/2011 | Ballantine | |
| 8,043,592 B2 | 10/2011 | Krass | |
| 8,057,575 B2 | 11/2011 | Edlund | |
| 8,075,645 B2 | 12/2011 | Jia | |
| 8,118,012 B2 | 2/2012 | Suzuki | |
| 8,124,347 B2 | 2/2012 | Plummer | |
| 8,137,638 B2 | 3/2012 | Yabe | |
| 8,138,380 B2 | 3/2012 | Olah | |
| 8,161,748 B2 | 4/2012 | Haase | |
| 8,206,576 B2 | 6/2012 | Moon | |
| 8,220,539 B2 | 7/2012 | Vinegar | |
| 8,241,471 B2 | 8/2012 | Griffin | |
| 8,277,631 B2 | 10/2012 | Eastman | |
| 8,303,782 B2 | 11/2012 | Ku | |
| 8,418,435 B2 | 4/2013 | Hatoum | |
| 8,449,757 B2 | 5/2013 | McLean | |
| 8,460,834 B2 | 6/2013 | Tange | |
| 8,497,043 B2 | 7/2013 | Cleland | |
| 8,668,897 B2 | 3/2014 | Rosenband | |
| 2001/0016283 A1 | 8/2001 | Shiraishi | |
| 2001/0046113 A1 | 11/2001 | Schmidt | |
| 2002/0022160 A1 | 2/2002 | Schmidt | |
| 2002/0037452 A1 | 3/2002 | Schmidt | |
| 2002/0048548 A1 * | 4/2002 | Chaklader | C01B 3/08 |
| | | | 423/657 |
| 2002/0083644 A1 | 7/2002 | Sata | |
| 2002/0090539 A1 | 7/2002 | Getty | |
| 2002/0100836 A1 | 8/2002 | Hunt | |
| 2002/0155330 A1 | 10/2002 | Tanaka | |
| 2003/0033991 A1 | 2/2003 | Cheng | |
| 2004/0053085 A1 | 3/2004 | Smedley | |
| 2004/0247522 A1 | 12/2004 | Mills | |
| 2005/0026008 A1 | 2/2005 | Heaton | |
| 2005/0051439 A1 | 3/2005 | Jang | |
| 2005/0106097 A1 | 5/2005 | Graham | |
| 2005/0211480 A1 | 9/2005 | Kejha | |
| 2005/0232837 A1 | 10/2005 | Troczynski | |
| 2006/0037476 A1 | 2/2006 | Edlund | |
| 2006/0048808 A1 | 3/2006 | Ruckman | |
| 2006/0169593 A1 | 8/2006 | Xu | |
| 2006/0180464 A1 | 8/2006 | Griffin | |
| 2006/0289403 A1 | 12/2006 | Jouanneau | |
| 2007/0009425 A1 | 1/2007 | Johnssen | |
| 2007/0017154 A1 | 1/2007 | Hsu | |
| 2007/0020174 A1 | 1/2007 | Xu | |
| 2007/0028958 A1 | 2/2007 | Retti | |
| 2007/0039815 A1 | 2/2007 | Bartel | |
| 2007/0051633 A1 | 3/2007 | Meyer | |
| 2007/0205111 A1 | 9/2007 | Bayliss | |
| 2007/0207085 A1 | 9/2007 | Troczynski | |
| 2007/0217972 A1 | 9/2007 | Greenberg | |
| 2007/0217995 A1 | 9/2007 | Matsumura | |
| 2008/0005965 A1 | 1/2008 | Speranza | |
| 2008/0090121 A1 | 4/2008 | Zhao | |
| 2008/0115669 A1 | 5/2008 | Edlund | |
| 2008/0152967 A1 | 6/2008 | Roychowdhury | |
| 2008/0210088 A1 | 9/2008 | Pledger | |
| 2008/0241615 A1 | 10/2008 | Sugimasa | |
| 2008/0263954 A1 | 10/2008 | Hammel | |
| 2008/0317665 A1 | 12/2008 | Troczynski | |
| 2009/0000956 A1 | 1/2009 | Weidner | |
| 2009/0011297 A1 | 1/2009 | Jang | |
| 2009/0016944 A1 | 1/2009 | DuBrucq | |
| 2009/0029206 A1 | 1/2009 | Jung | |

(56) References Cited

U.S. PATENT DOCUMENTS

| | | |
|---|---|---|
| 2009/0035626 A1 | 2/2009 | Liao |
| 2009/0042072 A1 | 2/2009 | Vu et al. |
| 2009/0071332 A1 | 3/2009 | Kaul |
| 2009/0071471 A1 | 3/2009 | Cohen |
| 2009/0078568 A1 | 3/2009 | Ramaswami |
| 2009/0081497 A1 | 3/2009 | Vu et al. |
| 2009/0081501 A1 | 3/2009 | Vu et al. |
| 2009/0098423 A1 | 4/2009 | Bhattacharjee |
| 2009/0119989 A1 | 5/2009 | Withers-Kirby |
| 2009/0123356 A1 | 5/2009 | Mills |
| 2009/0123360 A1 | 5/2009 | Mills |
| 2009/0129992 A1 | 5/2009 | Mills |
| 2009/0142257 A1 | 6/2009 | Mills |
| 2009/0148729 A1 | 6/2009 | Mills |
| 2009/0162709 A1 | 6/2009 | Mills |
| 2009/0193781 A1 | 8/2009 | Haase |
| 2009/0194996 A1 | 8/2009 | Haase |
| 2009/0196801 A1 | 8/2009 | Mills |
| 2009/0294728 A1 | 12/2009 | Barkhordarian |
| 2009/0311579 A1 | 12/2009 | Day |
| 2009/0321244 A1 | 12/2009 | Smith |
| 2009/0324997 A1 | 12/2009 | Tsuji |
| 2010/0008844 A1 | 1/2010 | Heaton |
| 2010/0021376 A1 | 1/2010 | Silberman |
| 2010/0050500 A1 | 3/2010 | Pieraccini |
| 2010/0061923 A1 | 3/2010 | Reddy |
| 2010/0080735 A1 | 4/2010 | Zimmermann |
| 2010/0080755 A1 | 4/2010 | Parker |
| 2010/0089746 A1* | 4/2010 | Chang .................. C25B 1/08 204/269 |
| 2010/0112396 A1 | 5/2010 | Goldstein |
| 2010/0150824 A1 | 6/2010 | Withers-Kirby |
| 2010/0150826 A1 | 6/2010 | Troczynski |
| 2010/0156104 A1 | 6/2010 | Bottinelli |
| 2010/0247414 A1 | 9/2010 | Krass |
| 2011/0017153 A1 | 1/2011 | Moon |
| 2011/0017607 A1 | 1/2011 | Moon |
| 2011/0053016 A1 | 3/2011 | Braithwaite |
| 2011/0089029 A1 | 4/2011 | Volk |
| 2011/0094894 A1 | 4/2011 | Mason |
| 2011/0114075 A1 | 5/2011 | Mills |
| 2011/0139630 A1 | 6/2011 | Omasa |
| 2011/0146154 A1 | 6/2011 | Moderresi |
| 2011/0147204 A1 | 6/2011 | Leiato |
| 2011/0150756 A1 | 6/2011 | Adams |

FOREIGN PATENT DOCUMENTS

| | | |
|---|---|---|
| EP | 2048110 A1 | 4/2009 |
| EP | 2175051 A1 | 4/2010 |
| GB | 2344110 A | 5/2000 |
| JP | S5528396 A | 2/1980 |
| JP | S5567502 A | 5/1980 |
| JP | 2004505879 A | 2/2004 |
| JP | 2006306700 A | 11/2006 |
| WO | 2008015844 A1 | 2/2008 |

OTHER PUBLICATIONS

Garcia-Oton et al. "Electrochemical Regeneration of Activated Carbon Saturacted with Toluene", Journal of Applied Electrochemistry (2005) 35:319-325.*

US Department of Energy, "Reaction of Aluminum with Water to Produce Hydrogen", (2008), Version 1.0, 26 pages.

US Department of Energy, "Reaction of Aluminum with Water to Produce Hydrogen", (2010), Version 2.0, 27 pages.

Korosh Mahmoodi (2010) "Enhancement of Hydrogen Generation Rate in Reaction of Aluminum with Water", International Journal of Hydrogen Energy, No. 35, pp. 5227-5232.

* cited by examiner

METHODS AND SYSTEMS FOR PRODUCING HYDROGEN

CROSS-REFERENCE TO RELATED APPLICATIONS

This application is a continuation application of and claims benefit to U.S. application Ser. No. 14/235,022, filed on Jan. 24, 2014, which relates to and claims priority from International Application No. PCT/US2012/048025, filed on Jul. 24, 2012, U.S. Patent Application Ser. No. 61/511,322 filed Jul. 25, 2011, and U.S. Patent Application Ser. No. 61/592,284 filed Jan. 30, 2012, the entire disclosures of which are hereby incorporated herein by reference.

FIELD OF THE DISCLOSURE

The present disclosure relates to exemplary embodiments of methods and systems for producing hydrogen, and more particularly, to exemplary embodiments of methods and systems for producing hydrogen from chemical reactions.

BACKGROUND INFORMATION

Hydrogen can be considered to be a promising energy alternative to carbon-based fuels. Various technologies have been developed regarding the production and use of hydrogen as a fuel or energy source. While hydrogen may be considered to be a clean and desirable energy alternative to carbon-based fuels, various obstacles may exist in relying on hydrogen as an energy source as opposed to other forms of energy. Such obstacles may generally include the ability to efficiently, safely and economically produce, transport and store hydrogen.

One approach to producing hydrogen can include thermochemical processes. One such process can include carrying out chemical reactions between a sulfur-iodine compound and water at high temperatures (e.g., above approximately 800 degrees C.). Generally, the process can result in the splitting of the water molecules ($H_2O$) into hydrogen ($H_2$) and oxygen ($O_2$). The sulfur-iodine solution can be recycled in the process and therefore, other than hydrogen and oxygen, there may be no harmful byproducts.

Another approach to producing hydrogen can include electrolysis of water. Electrolysis requires the use of electricity, in accordance with Faraday's Law. Electrolysis can be a relatively inefficient process for producing hydrogen without the aid of another energy source (beyond the supply of electricity). Indeed, the energy consumed may be more valuable than the hydrogen produced. In order to make electrolysis an economically viable process, another energy source can be incorporated into the process. For example, high-temperature electrolysis utilizes a high-temperature heat source to heat the water and effectively reduce the amount of electrical energy required to split the water molecules into hydrogen and oxygen with higher efficiencies. Another approach can involve the extraction of hydrogen from fossil fuels, such as natural gas or methanol. This method can be complex and result in residues, such as carbon dioxide. Also, there is a worldwide limit to the amount of fossil fuel available for use in the future.

Other approaches are needed to address hydrogen production, such that the hydrogen production may be carried out in an effective, efficient and safe manner. A hydrogen-based economy can be a long-term, environmentally-benign energy alternative for sustainable growth. An increasing demand for hydrogen may arise as the worldwide need for more electricity increases, greenhouse gas emission controls tighten, and fossil fuel reserves wane.

SUMMARY OF EXEMPLARY EMBODIMENTS OF THE DISCLOSURE

At least some of the above described problems can be addressed by exemplary embodiments of the methods and systems according to the present disclosure. The present disclosure describes exemplary embodiments of methods and systems that can produce hydrogen on demand (HOD), which can make it unnecessary to store hydrogen in a pressurized tank.

The exemplary embodiments of the present disclosure describe methods and systems that can make it possible to control and sustain the continuous production of hydrogen. The controlled, sustained production of hydrogen can be achieved by, e.g., providing a chemical reaction with water, aluminum and an electro-activated material (e.g., electro-activated carbon). This chemical reaction can produce hydrogen at various production rates, and the hydrogen can be provided by, e.g., a hydrogen-production cell. The use of electro-activated carbon can make it feasible to provide a high production rate for hydrogen for various uses, such as but not limited to a fuel for, e.g., land vehicles, marine vessels and trans-oceanic ships, and also as a power source for commercial power plants and other plants in remote locations.

The exemplary embodiments of the present disclosure further describe methods and systems which can provide for safe, on-board and on-demand production of hydrogen close to a user system, using simple, safe and pollution-free metal oxidation reacting with water and electro-activated carbon. The electro-activated carbon in the exemplary embodiments can provide for a high-production rate, and a large-volume production of hydrogen. It can also provide low flow rate for applications in which smaller fuel cells may be required, such as, e.g., cellular phones.

For example, according to one exemplary embodiment of the present disclosure, a method of producing a catalyst for hydrogen production can be provided, comprising placing a carbon material in a vessel, providing water within the vessel, and providing electrical current through the water to electro-activate the carbon material by modifying the surface of the carbon material in the water. The method can further comprise adding an electrolyte in the water in the vessel. The electrical current can be provided at less than 5 amps.

In some exemplary embodiments, the carbon material can be one or more of pure carbon, solid carbon, crushed carbon, sintered carbon, carbon composites, charcoal, pressed carbon, carbon blocks, graphite, carbon granules, granulated activated carbon or coal. In some exemplary embodiments, the method can further comprise separating the electro-activated carbon from the water and drying the electro-activated carbon.

According to another exemplary embodiment of the present disclosure, a method of producing hydrogen can be provided, comprising combining electro-activated carbon with water and aluminum, and providing heat to the combination of the electro-activated carbon, aluminum and water to produce hydrogen. The combination of the electro-activated carbon, aluminum and water can be heated to a temperature range between approximately 150 degrees Fahrenheit to approximately 190 degrees Fahrenheit.

In some exemplary embodiments, the method can further comprise controlling the hydrogen production by heating the combination of the electro-activated carbon, aluminum and water to increase hydrogen production, and cooling or reducing the heat provided to the combination of the electro-activated carbon, aluminum and water to reduce hydrogen production. The method can further comprise controlling the hydrogen production by adding amounts of one or more of the electro-activated carbon, aluminum and water to increase the hydrogen production, and removing amounts of one or more of the electro-activated carbon, aluminum and water to decrease the hydrogen production. The water can comprise tap water, dirty water, high-calcium water, salt water, sea water, alkaline water or acidic water. In some exemplary embodiments, the method can further comprise mixing, burnishing or chopping the aluminum during hydrogen production.

According to another exemplary embodiment of the present disclosure, a system for producing hydrogen can be provided, comprising a vessel having a combination of electro-activated carbon, fuel and water, wherein the fuel is capable of tying up an OH group in a water molecule in a chemical reaction, and an apparatus for heating the vessel to produce a chemical reaction between the fuel and the water causing separation of the water molecule to produce hydrogen.

In some exemplary embodiments, the fuel can comprise lithium, sodium, potassium, rubidium, cesium, calcium, strontium, barium, barium oxide, pure aluminum, aluminum powder, aluminum granules or aluminum shavings. The fuel can comprise aluminum. In some exemplary embodiments, the system can further comprise one or more mechanisms for mixing, burnishing or chopping the aluminum during hydrogen production.

In some exemplary embodiments, the system can further comprise one or more mechanisms to control the hydrogen production in the vessel to produce hydrogen on demand. The one or more mechanisms can heat the combination of the electro-activated carbon, fuel and water to increase the hydrogen production, and cool or reduce the heat to the combination of the electro-activated carbon, fuel and water to decrease the hydrogen production. The one or more mechanisms can heat the combination of the electro-activated carbon, fuel and water to a temperature range between approximately 150 degrees Fahrenheit to approximately 190 degrees Fahrenheit.

In some exemplary embodiments, the hydrogen production can be controlled by adding amounts of one or more of the electro-activated carbon, fuel and water to increase the hydrogen production, and removing amounts of one or more of the electro-activated carbon, fuel and water to decrease the hydrogen production. The water can comprise tap water, dirty water, high-calcium water, salt water, sea water, alkaline water or acidic water.

The exemplary embodiments of the methods and systems according to the present disclosure allow for hydrogen generation from a liquid composition such as water. Further, the by-products can potentially be a pollution-free source of material for recycling to produce more aluminum.

BRIEF DESCRIPTION OF THE DRAWINGS

The foregoing and other objects of the present disclosure will be apparent upon consideration of the following detailed description, taken in conjunction with the accompanying drawings and claims, in which like reference characters refer to like parts throughout, and in which:

Figure 1:
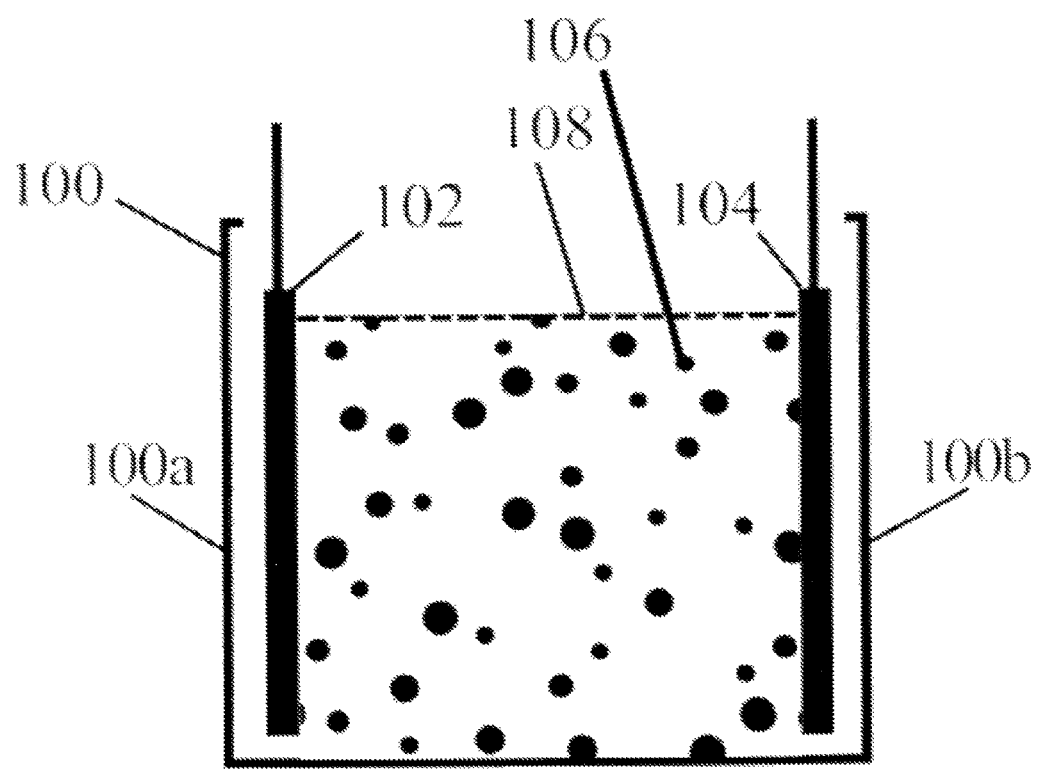
FIG. 1 illustrates an activation cell used to prepare a catalyst that can be used to produce hydrogen according to exemplary embodiments of the present disclosure.

Throughout the figures, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments. It is intended that changes and modifications can be made to the described embodiments without departing from the true scope and spirit of the present disclosure.

DETAILED DESCRIPTION OF EXEMPLARY EMBODIMENTS OF DISCLOSURE

Exemplary embodiments of the methods and systems according to the present disclosure will now be described, including reference to the figures.

Initially, in an exemplary embodiment of the present disclosure, a method and system for preparing a hydrogen producing catalyst is described. FIG. 1 illustrates a diagram of an activation cell 100 used to prepare a catalyst that can be used to produce hydrogen. In the exemplary embodiment of FIG. 1, the material can be carbon. The carbon can be any type of carbon of various forms, and the present disclosure is not limited to any particular form of carbon.

The activation cell 100 can have an anode 102 and a cathode 104. In an exemplary embodiment, the anode 102 can be placed inside the activation cell 100 along a first side 100a of the activation cell 100, and the cathode 104 can be placed inside the activation cell 100 along a second side 100b of the activation cell 100. The anode 102 can be a metal anode and the cathode 104 can be a metal cathode, and any type of metal can be used for the anode 102 and cathode 104, such as stainless steel, iron, galvanized iron, carbon and/or other metals, and the present disclosure is not limited to any type of metal. The metal can be electrically conductive and resistant to corrosion.

A liquid composition can be provided in the activation cell 100, such as water 108 or other liquid containing water, or other suitable liquid composition, and is not limited to water. The water 108 can be tap water, filtered water, salt water, sea water and/or other types of water. A material such as carbon 106 can be provided in the water 108 in the activation cell 100 in the form of, e.g., charcoal or graphite, so that it can be electro-activated. The activation cell 100 can be open on a top surface to allow ventilation and the placement of the water 108 and carbon 106. The water 108 can be in sufficient quantity to, e.g., cover the material being electro-activated. The activation cell 100 can be placed in a well-ventilated area such that any gas that is produced from the liquid during the electro-activation process can be ventilated.

An electrolyte can be placed into the activation cell 100 with the water 108 and carbon 106, which can make the mixture of the water 108 and carbon 106 more electrically conductive. Examples of electrolytes that can be used include, but are not limited to, sodium bicarbonate, sodium chloride or potassium hydroxide. The electro-activation can also be carried out with no added electrolyte, and a higher voltage may be used as the water can be less electrically conductive when an electrolyte is not added to the water. Electrical energy can be passed through the mixture of the water 108 and carbon 106 to electro-activate the carbon 106. For example, electrical energy, such as in the form of electrical current, can be passed through the mixture of water 108 and carbon 106 until a value of approximately 6 Ampere-hours is achieved. Also, for example, a range of voltage may be used, such as from approximately 4 volts to approximately 200 volts. Typically, a voltage in the range of approximately 12 volts to approximately 150 volts can be used. The exemplary embodiments of the present disclosure are not limited to any Ampere-hours or voltage, and adjustments may be made based on various factors, such as but not limited to the amount of water, the amount of material (e.g., carbon), the size of the activation cell, and/or other factors including the current density (e.g., Amperes per square centimeter) which can be a function of the geometry of the cell.

The catalytic activation cell 100 can be designed to run at a low current, e.g., less than approximately 5 amps, and can run continuously with no overheating due to power dissipation in the catalytic activation cell 100. This can provide for electro-activation of the material (e.g., carbon), and thereby convert the material into an electro-activated material. In the exemplary embodiments described above, carbon can be converted into electro-activated carbon, which can be referred to as catalytic carbon. Electro-activated carbon and catalytic carbon are used interchangeably in the present disclosure. Electro-activating the carbon at a low current can provide an advantage that the electro-activation may not need to be monitored to intervene in the event of, e.g., excessive current, excessive temperature or excessive gas emission from the cell.

In other exemplary embodiments of the present disclosure, the catalytic activation cell 100 can be designed to run at higher energy levels, such as 6 Ampere hours, which can be achieved by, e.g., providing electric current for 6 hours at a current of 1 Ampere, or for 3 hours at a current of 2 Amperes. In various embodiments of the present disclosure, different times and currents can be used to achieve 6 Ampere hours. The present disclosure is not limited to any particular Ampere-hours, and other Ampere-hour treatments would also produce catalytic transformation of the carbon.

The catalytic carbon (electro-activated carbon 106) can then be removed from the activation cell 100, and may be dried if desired. Once dried, the catalytic carbon may be easier to store and/or ship. The catalytic carbon may be dried by, e.g., air drying, heating in air, and/or other types of heating/drying mechanisms and/or methods. Different drying methods/processes may be used, and temperatures from standard room temperature to up to 200 degrees Fahrenheit can be used, and are not limited to such.

Exemplary Catalytic Reactions

In exemplary embodiments of the present disclosure, the chemical reaction:

$$2Al+6[H_2O]+C => C+2[Al(OH)_3]+3H_2 \qquad \text{Equation (1)}$$

can be used, where Al is aluminum, H is hydrogen, O is oxygen and C is the electro-activated carbon (or catalytic carbon) formed by the process described above. In this exemplary catalytic reaction, the aluminum and water ($H_2O$) can be used as fuels with the catalytic carbon, and hydrogen ($H_2$) can be produced where the by-product is aluminum hydroxide ($Al(OH)_3$). In this exemplary reaction, water and aluminum are fuels that can be consumed, and the catalytic carbon C can be a catalyst. Other liquid compositions having water, or having similar properties as water, can also be used.

The same reaction can be written as:

$$2Al+3[H_2O]+C => C+Al_2O_3+3H_2 \qquad \text{Equation (2)}$$

where Al is aluminum, H is hydrogen, O is oxygen and C is the electro-activated carbon (catalytic carbon) formed by the process described above. In this exemplary chemical reaction, the aluminum and water ($H_2O$) can be used as fuels with the catalytic carbon, and hydrogen ($H_2$) can be produced where the by-product is aluminum oxide ($Al_2O_3$). Aluminum hydroxide can reduce to aluminum oxide when dried, to remove water from the aluminum hydroxide. Because the hydrogen-producing reaction can be carried out in water, Equation 1 showing an aluminum hydroxide product is the reaction mostly used, while Equation 2 showing an aluminum oxide product can also be used when describing the chemistry. In this exemplary reaction, water and aluminum are fuels that can be consumed, and the catalytic carbon C can be a catalyst.

According to the exemplary embodiments of the present disclosure, many different forms of carbon can be electro-activated as described above to produce catalytic carbon. For example, in various experiments performed according to the exemplary embodiments of the present disclosure, it has been shown that hydrogen can be produced using carbon in many forms, which can include but is not limited to, pure carbon, solid or crushed carbon, sintered carbon, carbon composites, charcoal, pressed carbon (e.g., in the form of flat plates), carbon blocks (e.g., electric motor brushes) that can be formed with chemical binders, graphite (e.g., powdered carbon), carbon granules (e.g., for use as deodorizers), granulated activated carbon (GAC) that can be used for, e.g., water purification/filtering, and/or coal (lumped coal or crushed/pulverized coal).

Further, a fuel may not be required in order to generate hydrogen. Experiments have shown that catalytic carbon alone with a liquid composition, such as water or containing water, can produce hydrogen, according to the reaction:

$$H_2O+CC => CC+H+OH \qquad \text{Equation (3)}$$

A fuel can, however, increase the rate of production of hydrogen in the chemical reactions shown in Equations (1) and (2). When hydrogen atoms are generated, they can tend to combine, as in $H+H => H_2$ (a gas), which is referred to as the Toffel reaction. A competing reaction can also occur, such as $H+OH => H_2O$, a "recombination" reaction that can prevent the hydrogen from being liberated in the form of $H_2$ gas.

A fuel, such as aluminum, can be provided to help in this reaction as OH groups can be bound to the aluminum (Al) so that the accumulation of free (un-bound) OH groups can be largely prevented, such as in the liquid composition having the electro-activated carbon and aluminum, and the recombination with hydrogen atoms to form H₂O can be prevented.

Other elements, chemicals or fuels having the same effect as aluminum can also be used. For example, chemicals that tie up one OH group can be helpful, such as but not limited to Li (can form lithium hydroxide), Na (can form sodium hydroxide), K (can form potassium hydroxide), Rb (can form rubidium hydroxide) and Cs (can form cesium hydroxide). Other chemicals can be more helpful, which can tie up two OH groups, such as but not limited to Ca (can form calcium hydroxide), Sr (can form strontium hydroxide) and Ba (can form barium hydroxide).

Exemplary embodiments of the present disclosure can provide for aluminum as the fuel as each atom of aluminum can tie up three OH groups to become aluminum hydroxide, Al[OH]₃, aluminum can be inexpensive and safe, and aluminum can have a higher chemical binding energy than the OH groups. Some chemicals can be even more helpful such as barium oxide (BaO), which can tie up as many as 4 or 5 OH groups. Some experiments have shown that barium oxide can be a very good fuel with regard to hydrogen production, although there can be some safety issues and can generally be more expensive than aluminum.

Experiments were conducted to determine whether the electro-activation of a material, e.g., carbon, can increase hydrogen production. In each experiment, a catalyst was used with an aluminum and water mixture. In Experiment 1, non-electro-activated carbon was used as a catalyst. In Experiment 2, unwashed electro-activated carbon was used as a catalyst. In Experiment 3, washed electro-activated carbon was used as a catalyst, where the electro-activated carbon was rinsed with water after the electro-activation of the carbon.

EXPERIMENT 1

In Experiment 1, carbon (i.e., charcoal) was used as a catalyst that was not electro-activated. The chamber was cleaned, and approximately 3 teaspoons of aluminum powder (having a particle diameter of approximately 30 microns) were added to the chamber along with approximately 7 teaspoons of non-electro-activated charcoal. The chamber was filled to approximately 60% of the chamber with water so that the charcoal was slightly below the water line. A heating element was used to heat the mixture of the catalyst, aluminum powder and water. The temperature and hydrogen generation rates are provided in the chart below.

| TIME (minutes) | TEMP. (degrees Fahrenheit) | RATE (mL/min) |
|---|---|---|
| 0 | 91 | 0 |
| 2:15 | | Visual indication of bubbles |
| 5:00 | 123 | 10 |
| 6:30 | 128 | 80 |
| 10:25 | 140 | 220 |
| 12:15 | 144 | 180 |
| 31:00 | 157 | 160 |
| 40:00 | 160 | 160 |
| 50:00 | 155 | 140 |
| 54:00 | 161 | 90 |
| 73:00 | 164 | 110 |

It was observed that non-electro-activated charcoal did not produce significant hydrogen generation.

EXPERIMENT 2

In Experiment 2, carbon (i.e., charcoal) was used as a catalyst that was electro-activated at 6 Ampere hours. The chamber was cleaned, and approximately 2 teaspoons of aluminum powder (having a particle diameter of approximately 30 microns) were added to the chamber along with approximately 4 teaspoons of unwashed electro-activated charcoal. The chamber was filled with water and a heating element was used to heat the mixture of the catalyst, aluminum powder and water. The temperature and hydrogen generation rates are provided in the chart below.

| TIME (mins.) | TEMP (° F.) | RATE (mL/min) |
|---|---|---|
| 0 | 76 | 0 |
| 8:50 | 146 | 115 |
| 9:52 | 153 | 310 |
| 10:52 | 157 | 320 |
| 12:07 | 162 | 260 |
| 13:50 | 164 | 190 |
| 16:30 | 164 | 125 |
| 19:30 | 166 | 110 |
| 22:15 | 160 | 800 |
| 22:37 | 159 | 500 |
| 23:04 | 159 | 700 |
| 24:12 | 158 | 1200 |
| 27:20 | 154 | 2500 |
| 42:00 | 104 | |
| 43:30 | 111 | |
| 44:20 | 117 | 400 |
| 44:45 | 121 | 800 |
| 45:00 | 123 | 1300 |
| 45:15 | 125 | 1300 |
| 15:32 | 126 | 1200 |
| 45:58 | 130 | 700 |
| 46:52 | 135 | 360 |
| 48:26 | 141 | 210 |
| 50:41 | 143 | 125 |

At T=17:00, approximately 40 mL of hot water was added to the chamber. At T=21:00, approximately 1.5 teaspoons of aluminum powder was added to the chamber. At T=24:12, the heating element was turned off. A hydrogen generation rate of approximately 2.5 liters per minute was observed at T=27:20 at a temperature of approximately 154 degrees Fahrenheit. At T=28:00, the chamber was cooled, and the hydrogen generation rate decreased as the temperature decreased. At T=40:00, approximately 2 teaspoons of aluminum powder and approximately 2 teaspoons of electro-activated carbon were added to the chamber, and the heating element was turned on. At T=50:41, the heating element was turned off, and the temperature of the chamber started to drop.

In Experiment 2, it was observed that a hydrogen generation rate of approximately 2.5 liters per minute can be generated at a temperature of approximately 154 degrees Fahrenheit. It can be expected that a hydrogen cell having a similar amount of aluminum powder and catalyst could generate hydrogen at a rate of more than approximately 3 liters per minute at hydrogen cell temperature ranges of approximately 160 degrees Fahrenheit. The use of unwashed electro-activated carbon can increase the hydrogen production rate by approximately a factor of 10. In comparison, Experiment 2 generated hydrogen at a rate of approximately 2.5 liters per minute, and Experiment 1 generated hydrogen at a rate of approximately 0.22 liters per minute where a non-electro-activated catalyst was used.

EXPERIMENT 3

In Experiment 3, carbon (i.e., charcoal) was used as a catalyst that was electro-activated at 6 Ampere hours. After it was electro-activated, the charcoal was washed with running water for approximately 30 minutes. The chamber was cleaned, and approximately 2 teaspoons of aluminum powder (having a particle diameter of approximately 30 microns) were added to the chamber along with approximately 2 teaspoons of washed electro-activated charcoal. The chamber was filled with water and a heating element was used to heat the mixture of the catalyst, aluminum powder and water. The temperature and hydrogen generation rates are provided in the chart below.

| TIME (mins.) | TEMP (° F.) | RATE (mL/min) |
| --- | --- | --- |
| 0 | 78 | 0 |
| 0:30 | 99 | |
| 1:20 | 107 | 300 |
| 1:55 | 111 | 500 |
| 2:30 | 120 | 500 |
| 3:50 | 136 | 250 |
| 4:00 | 150 | |
| 6:36 | 152 | 450 |
| 6:55 | 152 | 1000 |
| 7:14 | 153 | 500 |
| 7:52 | 153 | 500 |
| 9:08 | 154 | 250 |
| 12:55 | 158 | |
| 14:00 | 153 | |
| 15:00 | 143 | |
| 16:00 | 134 | |

At T=4:00, the heating element was turned off. At T=5:00, approximately 0.5 teaspoons of aluminum powder was added. At T=9:08, it was observed that the chamber was running low on aluminum fuel. At T=12:55, a cooling element was introduced to the mixture of water, aluminum powder and catalyst, and a temperature drop was noted from T=12:55 to T=16:00.

In Experiment 3, it was observed that hydrogen can be generated at a rate of approximately 1 liter per minute using washed electro-activated carbon (i.e., charcoal) for a catalyst. By comparison, in Experiment 2, hydrogen was generated at a rate of approximately 2.5 liters per minute using unwashed electro-activated carbon as a catalyst.

Electro-Activation

In exemplary embodiments of the present disclosure, carbon (in the form of 16-mesh carbon granules) was electro-activated, and samples were removed at different lengths of time to determine how many Ampere hours produced a catalyst with a high rate of hydrogen production. Carbon was placed in a chamber and electro-activated at 2 Amperes. Sample 1 was removed after an electro-activation time of 1 minute, Sample 2 was removed after an electro-activation time of 45 minutes, Sample 3 was removed after an electro-activation time of 3 hours, Sample 4 was removed after an electro-activation time of 15 hours, and Sample 5 was removed after an electro-activation time of 16 hours.

Approximately ⅛ of a teaspoon of each catalyst material (i.e., Samples 1-5) was placed in individual chambers having approximately 20 mL of water each. Water used in this experiment was filtered tap water. Approximately ⅛ of a teaspoon of aluminum powder was provided in each chamber. The mixture of the aluminum, water and catalyst in each chamber was then brought to a temperature ranging from approximately 160 degrees Fahrenheit to approximately 200 degrees Fahrenheit. All the chambers were approximately at the same temperature at any given time, as all the chambers were provided on one multi-chamber container vessel that was placed on a heating device. Hydrogen generation rates were observed, and all five samples generated hydrogen. It was found that Sample 3 produces hydrogen at a higher rate than the other samples, and it was found that additional electro-activation time to that of Sample 3 had a small effect in the hydrogen production rate. In this exemplary embodiment, Sample 3 was electro-activated at 6 Ampere hours (i.e., 3 hours at 2 Amperes).

The tests described above provide that the catalytic carbon prepared according to the exemplary embodiments of the present disclosure can be an excellent material for use in splitting water to produce hydrogen at high rates of production. Further, the tests showed that after carbon is electro-activated according to the exemplary embodiments of the present disclosure, an enhanced effect as a catalyst can be semi-permanent, lasting up to several weeks and even months. The catalytic carbon is reusable (i.e., the catalytic effect of the electro-activation is preserved). The catalytic carbon can be stored and used months later, having the same effect as a fresh catalyst (i.e., catalytic carbon) with water and aluminum as fuels. Further, the catalytic carbon can be used several times over with water and aluminum being the only consumed fuels in the exemplary catalytic reactions described in the present disclosure.

In some exemplary embodiments, it was shown that catalytic carbon, in trace amounts, can be left behind in the vessel/hydrogen cell even after washing/cleaning of the vessel/hydrogen cell. Accordingly, in some experiments where electro-activated carbon was not used, but was used previously in the same vessel, some hydrogen production was noted when there should have been close to none. Accordingly, using the same vessel over and over can provide certain advantages when using catalytic carbon to produce hydrogen.

In some exemplary embodiments, it was found that "wet" electro-activated carbon (i.e., electro-activated carbon still wet from the water in the electro-activation process) produced hydrogen generation rates that were approximately 5-10% higher than the hydrogen generation rates produced when the catalytic carbon was dried. This can be because the wet catalytic carbon can have less surface-modification history. Washing the catalytic carbon can involve some minor surface changes at the surface of the carbon. Drying the catalytic carbon can also allow for possible surface abrasion when the carbon particles are moved, shifted or poured. Catalytic carbon can be a surface-reacting heterogeneous catalyst. In some exemplary embodiments, it has been shown that the carbon surface immediately following the electro-activation process can be optimum for hydrogen generation, and any surface treatment or damage following electro-activation (e.g., washing or drying) can result in slightly-reduced catalytic effectiveness when the catalytic carbon is used to split water and produce hydrogen in accordance with the catalytic reactions described in the present disclosure.

Carbon can exhibit good tendencies for electro-activation and use as a catalyst in hydrogen production with water. Carbon is an element that can have electronegativity similar to hydrogen and can form a polar bond with hydrogen. Carbon can form a polar oxide surface layer in water, and carbon can be pseudo-soluble in water in the form of a colloidal suspension of carbon particles in water.

The exemplary embodiments of the present disclosure can use water and aluminum as fuel for the exemplary chemical reactions described herein. The potential use of water from various sources and lower cost, lower purity aluminum can provide for alternative low-cost sources that can be used to provide fuels for the catalytic reactions according to the exemplary embodiments of the methods and systems of the present disclosure.

Aluminum, an element that can be used as a fuel in the exemplary embodiments of the present disclosure for producing hydrogen, can react with acids and bases. Like other active metals, aluminum can dissolve in strong acids to evolve hydrogen gas. The catalytic carbon described in the present disclosure can be used in pH-neutral liquid based on its strong catalytic efficiency (i.e., high reaction rate). This can mean that the water can be neither a strong acid nor a strong alkaline liquid, which can provide a very safe and environmentally-friendly mixture.

In some exemplary embodiments of the present disclosure, aluminum shavings can be used in the chemical reactions described herein instead of aluminum powder. The use of electro-activated carbon with aluminum shavings and other non-powder forms of aluminum have been shown to successfully produce hydrogen in a laboratory.

For a given mass of aluminum in the reaction, the hydrogen production rate can be approximately proportional to the surface area of the aluminum metal. The aluminum used in some of the exemplary embodiments of the present disclosure can be powdered aluminum. The higher surface-to-volume ratio of powdered aluminum can make it suitable for a higher rate of hydrogen production for a given amount of aluminum. More coarse fuel, which can be in the form of aluminum pellets, aluminum shavings, aluminum granules or aluminum sheets, can also be used. Such coarse fuel can provide for hydrogen production which can be at a lower rate (for a given amount of aluminum) than provided by powdered aluminum in some of the exemplary embodiments of the present disclosure. Use of pure aluminum may not be required, which can make possible the use of lower cost, lower purity aluminum in the hydrogen production according to the exemplary embodiments of the present disclosure.

The size of the aluminum used can be a design variable for a particular application. For example, the particle size of the aluminum can be chosen to achieve a desired hydrogen production rate for a design that has a defined geometry and operating temperature. In general, for a given amount of aluminum, as the particle size of the aluminum decreases, the reaction rate of the chemical reaction described in the present disclosure goes up at any given temperature. Also, the reaction rate increases as the temperature increases.

In some exemplary embodiments of the present disclosure, it was found that hydrogen is generated in the reaction described above without the use of aluminum (i.e., just using electro-activated carbon and water), but that adding certain fuels, such as aluminum, increased the production of hydrogen. It was also found that other fuels besides aluminum can be used. It was also found that during the catalytic reaction to generate hydrogen, when aluminum powder is being used, hydrogen generation can increase when the aluminum powder is mixed or stirred during the reaction. A mechanical action can be provided to remove aluminum oxide and expose bare aluminum. The chemical reactions described in Equations 1 and 2 produce hydrogen at higher rates when bare aluminum is used, and produce less hydrogen when using aluminum with an oxidized surface. In some exemplary embodiments of the present disclosure, by using a blender or other device to chop/burnish aluminum shavings and pellets, hydrogen production rates increased by factors of approximately two to ten, depending on the intensity of the mechanical or electro-mechanical action (i.e., chopping, burnishing and/or mixing of the aluminum). The factors can be dependent on the burnishing time and the time delay between burnishing and hydrogen production. This time delay can result in the formation of a film when the bare aluminum surface is exposed to air or water, particularly at temperatures above room temperature. Burnishing of the aluminum can remove the aluminum oxide from the surface of the aluminum, providing a fresh aluminum surface for the hydrogen-producing chemical reactions described in Equations 1 and 2 in the present disclosure.

There may be other methods/devices for removing the oxide/hydroxide and providing a substantially bare aluminum surface for the hydrogen-producing reactions described in the present disclosure, and the present disclosure is not limited to any such method/device. For example, in addition or as a substitute to mechanical burnishing, treatments of the aluminum surface may also be thermal, optical or chemical.

In some exemplary embodiments, aluminum shavings can be reacted with an aqueous solution of sodium hydroxide (NaOH), which can speed the chemical reactions described in the present disclosure reaction by a factor of 10 or more. This process can be a straightforward chemical reaction in which the sodium hydroxide undergoes a chemical change, i.e., the sodium hydroxide is transformed and consumed in the process.

The combination of the aluminum and sodium hydroxide can be combined with the catalytic reactions described in the present disclosure, i.e., Equations (1) and (2). For example, in some exemplary embodiments, hydrogen can be generated according to the following chemical reaction:

$$2Al+2[NaOH]+6[H_2O]+C \Rightarrow C+2[NaAl(OH)_4]+3H_2 \qquad \text{Equation (4)}$$

where the Al is aluminum, H is hydrogen, O is oxygen, $NaAl(OH)_4$ is sodium tetrahydroxyaluminate, and C is electro-activated carbon (or catalytic carbon). In this exemplary reaction, water, aluminum and sodium hydroxide can be fuels that can be consumed, and the catalytic carbon C can be a catalyst.

In some of these exemplary embodiments, the reaction can begin slowly which can be due to the layer of aluminum oxide on the surface of the aluminum. In these exemplary embodiments, once the layer of aluminum oxide is pierced during the reaction, the reaction can then speed up. In some exemplary embodiments, the reaction sped up after 1 to 3 minutes, at temperatures ranging from standard room temperature up to 180 degrees Fahrenheit. The speed of the reaction can depend on various factors, such as temperature, and the amount of aluminum, water and/or sodium tetrahydroxyaluminate. Other solutions and/or elements may be used to speed up the catalytic reaction, such as salt (NaCl) and/or other electrolytes.

According to the exemplary embodiments of the present disclosure, water can be used from various different sources. The use of pure water may not be required. Therefore, it may not be necessary to use distilled water or de-ionized water for the production of hydrogen, which can be more expensive than, e.g., tap water or sea water. In exemplary embodiments of the present disclosure, various water sources were used in the exemplary chemical reactions, including tap water, dirty water, high-calcium water, salt water, sea water, alkaline water, and acidic water. In these experiments, it was found that all these various water samples worked well in the chemical reactions of the exemplary embodiments of the present disclosure for hydrogen production. In some exemplary embodiments of the present disclosure, it was found that some forms of water, including salt water and alkaline water, can provide a slightly higher rate of hydrogen production than more pure forms of water, such as deionized water or distilled water. This can be because salt water and alkaline water can have additives that can tend to ionize the water, which can make it more chemically active and/or more mobile in an aqueous solution. This can be because electrostatic fields, created by the polar oxides, form forces that move the chemicals in the liquid.

The use of water from various sources can provide, e.g., more design latitude and freedom to a user in selection of construction materials for a hydrogen cell, water and water ingredients to minimize corrosion of the materials used in the construction of a hydrogen cell and associated parts according to the exemplary embodiments of the present disclosure. Such use of water from various sources can provide for significant cost reduction by, e.g., making it possible to use a wider range of materials.

The use of salt water and/or sea water for hydrogen production according to the exemplary embodiments of the present disclosure can make it suitable for marine applications, as well as providing an energy source for coastal areas. The exemplary embodiments of the present disclosure can provide hydrogen production in all parts of the world and near any seashore, including remote islands. Accordingly, many island nations can use the exemplary embodiments of the present disclosure to, e.g., decrease fuel costs and reduce or eliminate the need for tanker-ship import of fossil fuels.

The exemplary embodiments of the present disclosure can produce by-products that are fully recoverable using existing commercial methods for producing aluminum metal. The by-products from the hydrogen production methods and systems according to the exemplary embodiments of the present disclosure can be desirable because they are pure, and can contain no contaminants including bauxite, gibbsite, boehmite, goethite, hematite, kaolinite, and $TiO_2$. The large volume of by-products of the exemplary embodiments of the present disclosure can be $Al(OH)_3$ and $Al_2O_3$, which can be recycled to produce more aluminum metal. Recycling of aluminum hydroxide and aluminum oxide makes the exemplary embodiments of the present disclosure economically viable for large volume hydrogen production.

Aluminum refining from aluminum-bearing bauxite ore can use the Bayer process chemistry which can form a hydrate which can be essentially the same as the reaction product in the aluminum-water reactions described above according to the exemplary embodiments of the present disclosure. The hydrate can be calcined to remove the water to form alumina. The alumina can then be electrolytically reduced into metallic aluminum at about 900 degrees Celsius using the Hall-Heroult Process, producing aluminum metal with 99.7% purity.

Figure 2:
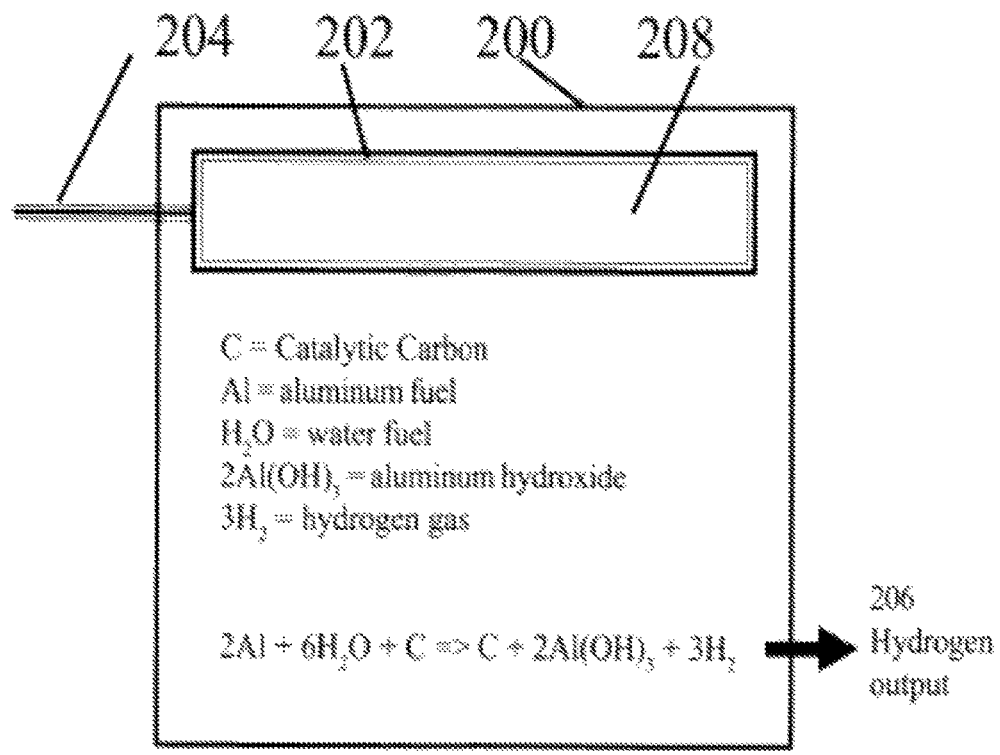
FIG. 2 illustrates a system for the production of hydrogen according to exemplary embodiments of the present disclosure.

FIG. 2 illustrates a system for the production of hydrogen according to exemplary embodiments of the present disclosure. A hydrogen cell 200 can be provided where a heating subunit 202 can be provided having a heating element 208 within. The heating element 208 can be of various types, such as an electrical heater, a glow plug, a heat-exchanger coil with hot water running through it, but is not limited to such. A power supply, such as, e.g., a wire 204, can be provided to power the heating subunit 202 and/or heating element 208. If hot water is used to provide heat to the heating element 208, 204 can represent the input/output of the hot water. In other embodiments, the heating element may run independently on a battery and/or may be within the hydrogen cell 200. Within the hydrogen cell 200, aluminum and water can be provided as, e.g., fuels, and catalytic carbon can be provided as, e.g., a catalyst. The catalytic carbon, water and aluminum can be in contact with each other in a mixture in the hydrogen cell 200 as needed to, e.g., heat the mixture of the catalytic carbon, water and aluminum.

In an exemplary embodiment of the present disclosure, one part catalytic carbon can be provided with one part aluminum, which can be in the form of aluminum powder, flakes or granules, with approximately three parts water, in the hydrogen cell 200. Various ratios of the catalytic carbon, aluminum and water can be used, and the present disclosure is not limited to any particular ratio. In some exemplary embodiments, 1-3 tablespoons of 30-micron aluminum powder can be used as the fuel.

The mixture of the catalytic carbon, water and aluminum can then be heated using the heating element 208 to a temperature of approximately 140 degrees Fahrenheit to approximately 190 degrees Fahrenheit. The present disclosure is not limited to any temperature ranges, and various temperatures may be used according to different embodiments of the present disclosure. In some exemplary embodiments, the mixture can be heated to approximately 180 degrees Fahrenheit, which can prevent excessive loss of water due to vaporization or boiling. Water evaporation (and heat loss, or cooling) can be controlled and limited by operating the hydrogen cell in a temperature range of approximately 160 degrees Fahrenheit to approximately 180 degrees Fahrenheit that is below the boiling temperature of water (i.e., 212 degrees Fahrenheit at sea level). From the equations described above, the reaction produces hydrogen and aluminum hydroxide, and the hydrogen can be collected at hydrogen output 206. The aluminum hydroxide can be collected within the hydrogen cell 200 or outside of the hydrogen cell 200, using appropriate structures and elements.

Figure 3:
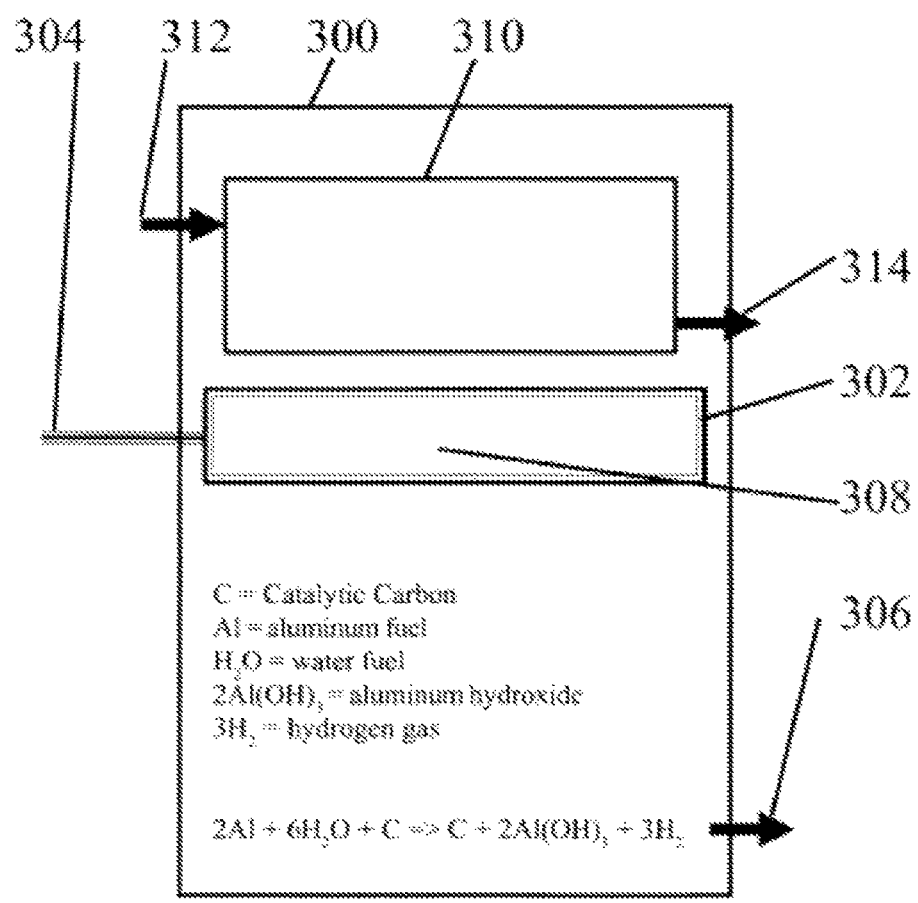
FIG. 3 illustrates a system for the production of hydrogen according to exemplary embodiments of the present disclosure.

FIG. 3 illustrates a system for the production of hydrogen according to exemplary embodiments of the present disclosure. The system of the exemplary embodiment of FIG. 3 is similar to the system in the exemplary embodiment of FIG. 2, which can have a hydrogen cell 300, a wire 304 providing electrical power to a heating element 308 within a heating subunit 302, where catalytic carbon is used as a catalyst and aluminum and water are used as fuels. The heating element 308 heats the mixture of catalytic carbon, aluminum and water to produce hydrogen and aluminum hydroxide, and the hydrogen can be collected at hydrogen output 306. In addition, the exemplary embodiment of FIG. 3 can have a cooling subunit 310. For example, the cooling subunit can have within a cooling coil having a cold water input 312 and a water output 314. The cooling coil can be in contact with the mixture of water, aluminum and catalytic carbon. The cooling can slow down the reaction process, thereby decreasing the rate and volume of hydrogen generation. Such a system can be used to produce hydrogen on demand, where appropriate instruments and tools can be used to produce the temperatures needed to increase and slow down the rate and volume of hydrogen generation.

Figure 6:
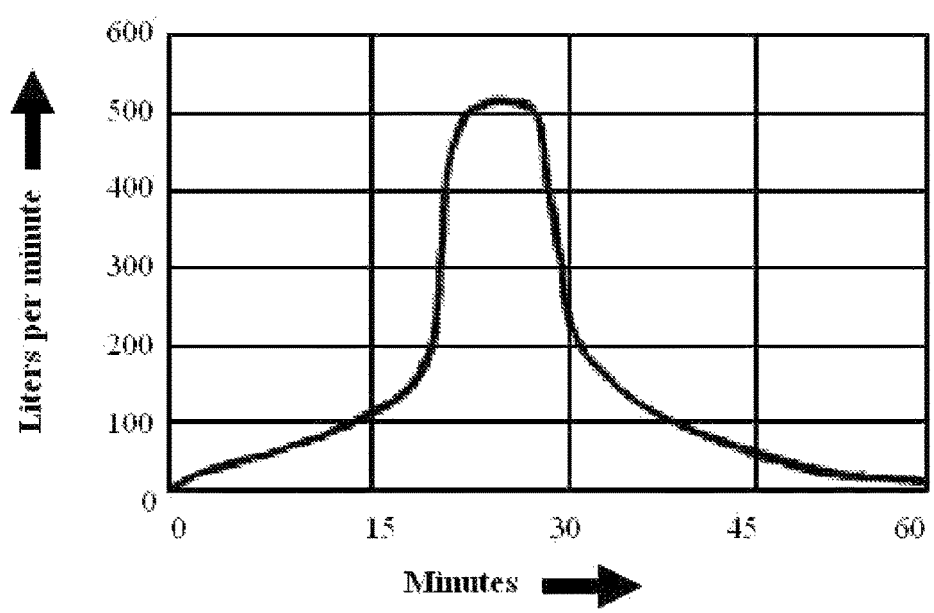
FIG. 6 illustrates a graph showing hydrogen production according to exemplary embodiments of the present disclosure.

In an experiment of the system of FIG. 3 according to the exemplary embodiments of the present disclosure, the hydrogen cell 300 was filled with approximately one pint of tap water, along with approximately 4 mL of aluminum powder (having a particle size of 3 microns) and approximately 4 mL of electro-activated carbon. The heating subunit 302 heated the mixture of water, aluminum powder and electro-activated carbon at approximately 2-3 degrees Fahrenheit per minute. The hydrogen cell 300 was heated for approximately 30 minutes, and the heating subunit was then turned off. The temperature of the hydrogen cell 300 at this time was approximately 190 degrees Fahrenheit. As shown in FIG. 6, the rate R of hydrogen production at time t=20 minutes was approximately 300 mL/min, and soon after peaked at approximately 490 mL/min.

When the hydrogen producing reaction began, the exothermic nature of the reaction kept the temperature at approximately 190 degrees Fahrenheit until the fuel (i.e., aluminum powder) was mostly consumed at approximately t=50 minutes into the experiment. The total volume of hydrogen produced in the experiment was approximately 4 liters. At approximately t=25 minutes, cold water was provided into the cooling subunit 310 (i.e., cooling coil) through cold water input 312, and the cooling rate was measured to be approximately 2-3 degrees Fahrenheit per minute.

In a second experiment, using the same electro-activated carbon from the previous experiment, approximately 12 mL of aluminum powder was provided in the hydrogen cell 300. The peak hydrogen production rate was measured to be approximately 2.5 liters per minute at approximately t=12 minutes. After approximately 25 minutes, the total volume of hydrogen gas produced was approximately 20 liters. After the experiments, no corrosion was visible on the heating subunit 302, cooling subunit 310 or hydrogen cell 300.

The exemplary system of FIG. 3 can provide hydrogen "on-demand." Heating up the hydrogen cell 300 can increase the temperature and increase the hydrogen production. Factors (i.e., control parameters) that can be considered when generating hydrogen and increasing the hydrogen production can be the amount of water, amount of electro-activated carbon, amount and type of aluminum, the manner and rate of oxide/hydroxide removal from the aluminum surface, and the temperature.

Cooling the hydrogen cell (e.g., by providing cold water into the hydrogen cell) can reduce the temperature, thereby reducing the hydrogen production. When providing hydrogen on-demand, various factors (i.e., control parameters) can be considered in order to decrease the rate of hydrogen production. For example, if the amount of water is reduced, such as by removing the water from the hydrogen cell, this can stop the production of hydrogen. Reducing the amount of electro-activated carbon can also reduce the amount of hydrogen production, although it can be difficult to completely remove all the electro-activated carbon, as trace amounts may still be in the hydrogen cell. Reducing the temperature in the hydrogen cell can also reduce the hydrogen production. For example, reducing the temperature of the hydrogen cell by approximately 18 to 20 degrees Fahrenheit can reduce the hydrogen production rate in the hydrogen cell by a factor of approximately 2. Reducing the temperature of the hydrogen cell by approximately another 18 to approximately 20 degrees Fahrenheit can again reduce the hydrogen production in the hydrogen cell by a factor of approximately 2, and so on. This can be done by using a cooling subunit 310, or other devices/methods to reduce the temperature of the hydrogen cell 300.

Aluminum can be a more efficient fuel in the chemical reaction with water and electro-activated carbon when burnished (i.e., using mechanical scrubbing to remove aluminum oxide and/or aluminum hydroxide films covering the surface). If a mechanical action of burnishing or stirring or any other method is used to remove the aluminum oxide and/or aluminum hydroxide on the surface of the aluminum, then stopping that process or reducing that process in the hydrogen cell can cause aluminum oxide to form on the surface of the aluminum, which can reduce the hydrogen production. Also, removing the aluminum from the hydrogen cell or from the reaction can also stop the hydrogen production in the hydrogen cell. These control parameters can each be used alone or in combination with one another to slow or stop the hydrogen production, thereby providing hydrogen on-demand.

It may be possible to control the maximum hydrogen production rate, e.g., in a vehicle, by using the vehicle's thermostat that regulates engine/radiator water temperature (typically about 195 to 200 degrees Fahrenheit for a car) to achieve a regulated hydrogen cell temperature. At that temperature, a catalyst can be blended to achieve a desired hydrogen maximum flow rate. This can make it unnecessary to measure and control the hydrogen cell temperature unless the exothermic nature of the reaction makes it necessary to do so. If, due to exothermic temperature rise, the hydrogen cell temperature exceeds the engine/radiator water temperature in an automobile (typically 195 to 200 degrees Fahrenheit), the water in the vehicle's radiator system can then begin to cool the hydrogen cell, thereby providing temperature regulation. In this exemplary design concept, cooling from a different water (or other coolant, including but not limited to freon, ethylene glycol and/or propylene glycol) source can also be used to slow down the chemical reaction when the engine is stopped. Other hydrogen shutdown methods can be water starvation and/or aluminum starvation.

The systems described in the present disclosure can be combined with existing systems for producing hydrogen in some exemplary embodiments of the present disclosure. For example, a hybrid system can be provided for producing hydrogen that combines the system(s) of the present disclosure with an electrolysis system. An electrolysis system can produce significant heat, and that heat can be used to start or to keep up the reactions described in the present disclosure. For example, the heat from an electrolysis system can start or keep up the reaction of Equation 1, where water, aluminum and electro-activated carbon are heated to produce hydrogen. The hydrogen produced from either one or both systems can then be used for the particular purpose. This can provide a method and system where pH-neutral chemistry can be used, which is different from the prior art methods and systems used for generating hydrogen using electrolysis.

There can be several advantages for using a hybrid system. A single chamber can provide for electro-activation of the carbon, as well as provide for hydrogen generation. Accordingly, the carbon can continuously be converted to electro-activated carbon and then produce hydrogen. Another advantage can be that more hydrogen can be produced per unit energy input than if electrolysis alone were used, and the power input required for electrolysis can be used to heat the catalytic reactions described in Equations 1 and 2 to a desired operating temperature. Further, the electrolysis chemistry can aid in oxidizing the aluminum in the catalytic reactions described in Equations 1 and 2 to tie up OH chemical groups when the water is split into H and OH groups.

In some exemplary embodiments, a hybrid system can use electrolysis and catalytic carbon in combination to produce hydrogen. Often, when using electro-activated carbon with a fuel, such as aluminum, aluminum oxide and aluminum hydroxide can be formed in the form of large solids. These solids can be large, and can be difficult to remove during operation of the cell as well as during maintenance of the cell. If a low current electrolysis is used in the liquid composition containing the electro-activated carbon and aluminum, then formation of these large solids can be prevented, such that only very small grains of aluminum oxide and aluminum hydroxide are formed. Another advantage of providing electrolysis to the cell can be that the energy deposited in the liquid can be a source of heat. Heat can be used for the catalytic carbon reaction to produce hydrogen at a higher rate, such that the hydrogen production rate can double with every increase in temperature of approximately 18 to approximately 20 degrees Fahrenheit.

Various other combinations of hybrid systems are contemplated by the present disclosure and are not limited to the above.

In exemplary embodiments of the present disclosure, experiments were run to test the purity of the hydrogen produced based on the chemical reaction of Equation 1. The electro-activated carbon in this experiment was electro-activated at 6 Ampere hours. Approximately 400 mL of high-purity HPLC grade water was provided in a chamber of a hydrogen cell and heated to approximately 170 degrees Fahrenheit. Then, approximately 12 grams of the electro-activated carbon and approximately 18 grams of aluminum powder were added into the chamber of the hydrogen cell. The reaction achieved a maximum hydrogen generation rate of approximately 200 mL/min. It was determined through measurement instrumentation that the hydrogen produced by this reaction was approximately 93% pure. The hydrogen production began with air in the chamber of the hydrogen cell and in the tubes leading to the measurement instrumentation for the testing of the hydrogen purity. The remaining 7% can be air which can contain water vapor, and the amount of the water vapor can depend on the temperature of the hydrogen cell during the reaction. In this configuration, using the reactions described in Equation 1, the hydrogen automatically separates from the catalytic carbon, water and aluminum, and there was no need for a phase separator in the measurement for the hydrogen purity.

Figure 4:
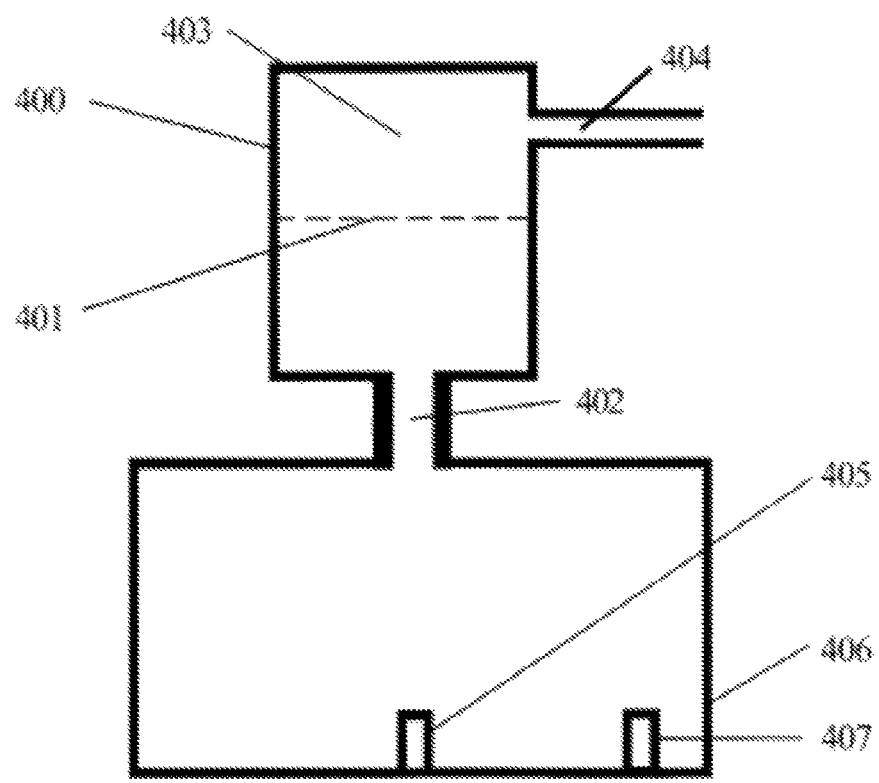
FIG. 4 illustrates a system for providing hydrogen as a fuel for a vehicle according to exemplary embodiments of the present disclosure.

FIG. 4 illustrates a system for providing hydrogen as a fuel to a vehicle according to exemplary embodiments of the present disclosure. The system can comprise of two primary vessels, a bubbler 400 and a hydrogen cell 406. The hydrogen cell 406 can be connected to the bubbler 400 by a tube 402 through which hydrogen bubbles can rise from the hydrogen cell 406 to the bubbler 400. The hydrogen cell 406 can be heated with a glow plug 405, or some other type of heating element/device. The glow plug 405 or other heating element can be electronically controlled to maintain a hydrogen cell temperature, e.g., approximately 180 degrees Fahrenheit, using a thermistor temperature sensor 407 or other similar temperature sensing and controlling device. Water, aluminum (e.g., aluminum powder) and catalytic carbon can be placed in the hydrogen cell 406.

A water level 401 can be maintained such that the hydrogen cell 406 can be full of the mixture of the water, aluminum powder and catalytic carbon, and the bubbler 400 can be partially filled with the mixture up to the water level 401. A mechanical action can be added into the hydrogen cell in order to burnish/stir/mix the aluminum if desired to remove any aluminum oxide from the aluminum surface in order to generate more hydrogen, if needed. Once heated, hydrogen bubbles will rise to the chamber area 403 in the bubbler 400 using gravity flow, and the hydrogen gas can be provided to an air-intake manifold of the vehicle engine through outlet 404.

In an experiment using the exemplary system of FIG. 4, the hydrogen cell 406 and bubbler 400 were attached to an engine of a test vehicle using brackets to hold the hydrogen cell 406 and bubbler 400, and the outlet 404 was connected to an air-intake manifold of the engine of the test vehicle. No oxygen sensor adjustments or other engine modifications were implemented. Under normal driving conditions (i.e., no hydrogen), the test vehicle achieved approximately 26-28 miles per gallon during highway driving using regular unleaded fuel.

The first (non-optimized) experimental operation of the test vehicle showed that providing hydrogen produced a dramatic increase in miles per gallon. At t=0 minutes, the hydrogen cell 406 was charged with approximately 2 teaspoons of aluminum powder, approximately 2 teaspoons of catalytic carbon, and water. The heating element (i.e., glow plug) was turned on. Initial heating and hydrogen flow took approximately 5 minutes. Hydrogen was formed in the chamber 403 of the bubbler 400. At t=5 minutes, the test vehicle was started with hydrogen flowing from the outlet 404 to the vehicle engine. The electronic fuel injection (EFI) computer automatically began operation in the open loop mode (i.e., normal engine start-up mode, with no feedback signals from the oxygen sensors) to closed loop (i.e., normal mode after the engine warms up, using feedback signals from the oxygen sensors). During this warm-up period, hydrogen was flowing from the hydrogen system output 404 to the air-intake manifold of the engine of the test vehicle. The test vehicle was brought to a speed of approximately 55 miles per hour on a highway, and the hydrogen flow rate was estimated to be approximately 0.3 liters per minute. The vehicle was obtaining approximately 37 miles per gallon as measured by a scan gauge adjusted to measure real-time mileage in units of miles per gallon.

At t=10 minutes, the hydrogen flow rate was noted to be decreasing with time. The test vehicle was getting approximately 35.7 miles per gallon. The solenoid valve (provided in the plumbing between the outlet 404 to the engine of the vehicle) was switched so that hydrogen was vented to the air (not piped to engine). The miles per gallon dropped approximately 6.7%, from approximately 35.7 miles per gallon to approximately 33.3 miles per gallon.

The test vehicle demonstrated a 32% increase in miles per gallon during the first non-optimized experimental run. In several subsequent test runs with some refinements (i.e., higher hydrogen flow rates), the vehicle demonstrated up to a 40% increase in miles per gallon.

Conventional methods of producing hydrogen (e.g., electrolysis, thermo-forming, etc.) can produce hydrogen at low rates when measured in units of volume per minute, or liters per minute (LPM) per gram of material per joule of required energy, or LPM/gm per joule. Using this exemplary benchmark for production rate evaluation leads to the conclusion that electrolysis and thermo-reforming are poor performers simply because of the high energy (measured in joules) required to drive the processes.

In the exemplary embodiments of the present disclosure, hydrogen production rates can be much higher than that of electrolysis or thermo-reforming processes. These exemplary embodiments can use external heat to start the chemical reaction described above, which can generally be in the temperature range of approximately 150 degrees Fahrenheit to approximately 190 degrees Fahrenheit, but are not limited to this temperature range. Generally, the reaction temperature can be as low as standard room temperature, and even lower, although the hydrogen generation rate can decrease by approximately 50% for every approximately 18-20 degrees Fahrenheit reduction in operating temperature. The reaction temperature can be as high as the boiling temperature of water, and even higher in a steam environment where higher flow rates are required. The exemplary embodiments of the present disclosure are not limited to a particular temperature range.

Once started, as the catalytic reactions described in the present disclosure are fundamentally exothermic, the reactions can provide enough heat to sustain the reactions if the hydrogen cell thermodynamic equilibrium is designed to occur at the desired operating temperature. Thermodynamic-equilibrium operating conditions can be achieved when the amount of energy (heat) leaving the system is the same as the amount of energy (heat) entering the system (primarily because of the heat being generated by the exothermic reaction). Under these experimental conditions, the system temperature can remain constant, and externally-supplied energy may not be required for heating or cooling. Under different (non-thermal equilibrium) operating conditions, the only external energy required may be for cooling, if needed to limit the hydrogen production rate to, e.g., a desired target value, and/or limit the temperature of the cell to prevent boiling or excessive loss of water vapor.

In exemplary embodiments of the present disclosure, several experimental runs were carried out in which hydrogen peak production rates of approximately 400 mL/minute to approximately 4 liters/minute were obtained in a cell, where in each cell tap water was provided with approximately 10 grams to approximately 40 grams of powdered aluminum, and approximately 2 teaspoons of catalytic carbon that had been electro-activated for approximately 6 Ampere hours. These experimental cells had reaction-chamber volumes ranging from approximately 100 mL to approximately 1 liter. High rates of hydrogen production were demonstrated in the experimental runs (e.g., approximately 400 mL/minute to approximately 4 liters/minute) at temperatures ranging from approximately 160 degrees Fahrenheit to approximately 190 degrees Fahrenheit. Higher rates can be provided according to the exemplary embodiments of the present disclosure by, e.g., using larger cells, in which more catalytic carbon, aluminum and water can be provided. It was demonstrated that controlled, sustained production of hydrogen can be achieved by providing water, aluminum and catalytic carbon to a hydrogen-production cell.

Figure 5:
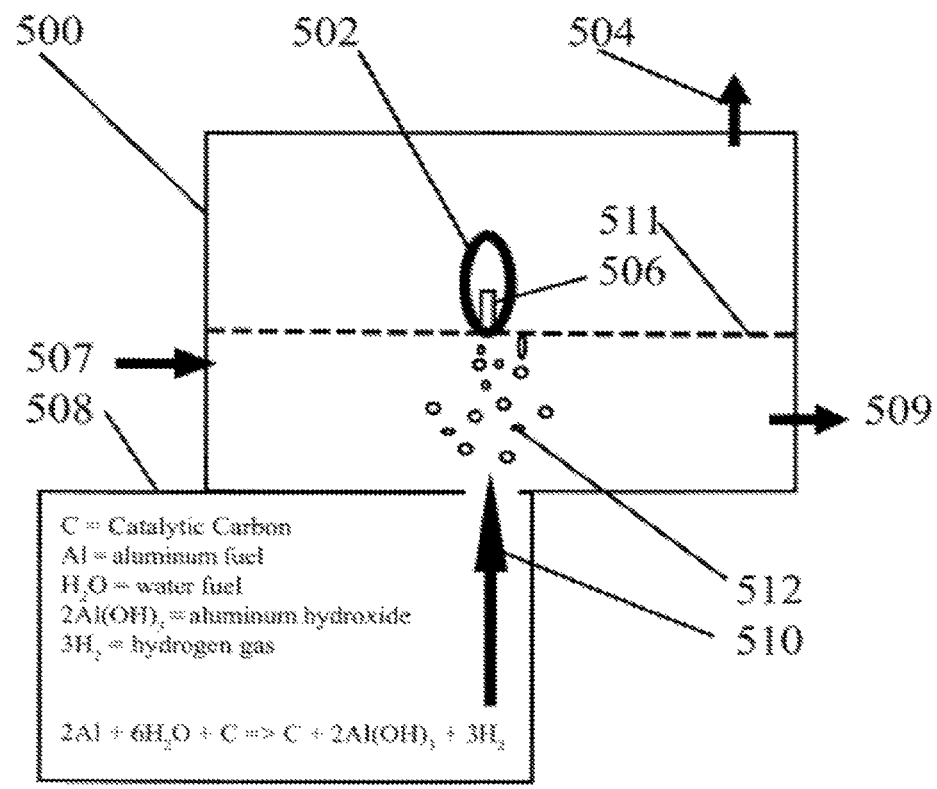
FIG. 5 illustrates a boiler system according to exemplary embodiments of the present disclosure.

Many other applications for hydrogen production are contemplated by the present disclosure along with providing fuels for land and marine vessels, as well as for power generation (e.g., power plants). As shown in FIG. 5, a boiler system can be provided according to exemplary embodiments of the present disclosure, to provide heat for a building structure, such as a home or commercial building. As shown in the exemplary boiler system of FIG. 5, a hydrogen cell 508 can be provided, in which water, aluminum and catalytic carbon can be provided to produce hydrogen gas. The hydrogen gas, though gravity/buoyancy flow, will proceed in an upwards direction 510 to a boiler system 500 (or alternatively, can be directed to the boiler system 500 through appropriate tubing/piping in another exemplary design).

Hydrogen bubbles 512 will proceed in an upwards direction to a water level 511 in the boiler system 500. A water inlet 507 (which can be room temperature or hot water) and a water outlet 509 can be provided in the boiler system 500. Air can be injected in the water or close to the surface of the water level 511 where the hydrogen bubbles 512 appear by, e.g., a hose, pipe, air compressor, valve, air pressure regulator or other such type of device. An igniter 506 can be provided to ignite the combustible mixture of hydrogen and air, to provide a flame 502 within the boiler system 500. The heat provided by the flame in the boiler system 500 can be supplied to a heating element, such as fins or other heat-radiating elements for use as a heater, or the water can be heated without heat radiating elements because of the direct flame-to-water contact.

In another exemplary embodiment of the system of FIG. 5, a boiler system can be operated at a pressure higher than 1 atmosphere, and steam can be provided through outlet 504 to, e.g., drive turbines to make electricity or provide heat. The operation of a pressurized steam boiler can be fitted with pressure regulators and other equipment designed for both control and safety of operation.

There can be many advantages to a boiler system using hydrogen as described in FIG. 5. For example, since a burner is not required, there is no burner corrosion or maintenance required. The flame can be in direct contact with the water to heat the water. There is no firebox (furnace) required, and there are no hot gas tubes, fly-ash build up (typically a problem for coal-burning furnace/boiler systems) and no maintenance of the tubes is required. There is no smokestack required, and the combustion products are merely water/steam. Further, there are no unwanted effluents or emissions and no environmental contamination.

Fossil fuel shortage can be a worldwide problem in the coming years. Fuel transport and storage can also be a major logistics support problem, such as for mobile military units. The exemplary embodiments of the present disclosure can make it possible to reduce the need for transport and storage of large volumes of fossil fuel. The availability of fuel in the exemplary embodiments of the present disclosure can be based on the availability of water and aluminum. Dry aluminum is not explosive under normal conditions, and it can be easy to transport and store. It may not require special handling or special shelter requirements because when exposed to natural weather extremes it quickly forms a protective oxide which can prevent erosion, corrosion or other damage to the aluminum. Water can be transported easily in various forms. Tap water, sea water, salt water and/or any type of water may be used as a fuel in the exemplary embodiments of the present disclosure.

There are only a few materials that can produce abundant hydrogen and these can include hydrocarbons and water. Of these materials, water can be a pollution free source of hydrogen. One of the problems that must be addressed before a new hydrogen economy replaces the current "oil/gas/coal/nuclear" economy, can be finding a safe, environmentally benign and cost-effective method of generating hydrogen at a desired rate. The exemplary embodiments of the present disclosure provide safe, cost-effective and environmentally-benign methods and systems of hydrogen generation.

Carbon, water, aluminum, aluminum oxide and aluminum hydroxide can be some of the safest materials known (e.g., they are commonly used in foods, drugs, cosmetics and other safe to use/handle products). The exemplary embodiments of the present disclosure provide these elements in methods and systems that work using a wide range of pH, which can include neutral pH values in the range of 6 to 8. The use of neutral pH chemistry can eliminate the threat of acid burns or alkali burns to human skin and eyes. Alkali-burn damage to the eyes, due to an accidental splash, can be a safety hazard when using electrolytes with electrolysis to produce hydrogen. Electrolysis can fundamentally require the use of a strong electrolyte to increase the electrical conductivity of the water, whereas the exemplary embodiments of the present disclosure can produce hydrogen chemically, without the use of electrolysis and without the requirement for electrolyte additives. The exemplary embodiments of the present disclosure can be safe and manageable by simple care.

Some metals other than aluminum can spontaneously produce hydrogen when those metals come in contact with water. For example, metals such as potassium (K) and sodium (Na) can produce hydrogen when they come in contact with water. However, the residual hydroxide product (i.e., KOH in the sodium reaction) can be corrosive, dangerous to handle and potentially polluting to the environment. These metals can be used as water-splitting agents through a simple reaction, which can proceed spontaneously once the metal is dropped into water, but these reactions can be less safe than aluminum and cannot be controlled as easily as aluminum and the reactions described in the exemplary embodiments of the present disclosure.

The exemplary embodiments of the methods and systems described herein can facilitate and/or provide, e.g., fuel for vehicles (trucks, cars, motorcycles, etc.), fuel for marine vessels (boats, submarines, cargo ships, etc.), power for power plants which can provide electricity for buildings, cities, etc., and several other applications where hydrogen can be used as a source of fuel/power. For applications requiring heater water or steam, a boiler apparatus can be possible due to the catalytic carbon reactions described herein that can produce hydrogen under water. There are many fields of use and embodiments contemplated by the present disclosure in which hydrogen production, ranging from low to very high flow rates, requiring no tank storage, can be used for various purposes.

Various other considerations can also be addressed in the exemplary applications described according to the exemplary embodiments of the present disclosure. Various rates of hydrogen generation, along with different volumes of hydrogen generation, can be provided depending on the field of application. Different factors such as the amount of water, amount of fuel, such as aluminum, and amount of electro-activated carbon can be a factor. One skilled in the art can understand that routine experimentation based on the exemplary embodiments of the present disclosure can provide various rates and volumes of hydrogen generation. Controlling the temperature during these reactions can provide hydrogen on demand, and hydrogen cells can be constructed that can regulate the temperature of the chamber of the hydrogen cell during the reaction to provide hydrogen on demand to, e.g., a vehicle.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, manufacture and methods which, although not explicitly shown or described herein, embody the principles of the disclosure and are thus within the spirit and scope of the disclosure.

What is claimed is:

1. A method comprising:
   placing a carbon material in a vessel;
   providing water within the vessel;
   providing electrical current through the water to oxidize the surface of the carbon material in the water to produce electro-activated carbon; and
   separating the electro-activated carbon from the water.

2. The method of claim 1, further comprising:
   adding an electrolyte in the water in the vessel.

3. The method of claim 1, wherein the electrical current is provided at less than 5 amps.

4. The method of claim 1, wherein the carbon material is one or more of pure carbon, solid carbon, crushed carbon, sintered carbon, carbon composites, charcoal, pressed carbon, carbon blocks, graphite, carbon granules, granulated activated carbon or coal.

5. The method of claim 1, further comprising:
   drying the electro-activated carbon after separating the electro-activated carbon.

6. A method of producing hydrogen, comprising:
   combining electro-activated carbon with water and aluminum; and
   providing heat to the combination of the electro-activated carbon, aluminum and water to produce hydrogen.

7. The method of claim 6, wherein the combination of the electro-activated carbon, aluminum and water is heated to a temperature range between approximately 150 degrees Fahrenheit to approximately 190 degrees Fahrenheit.

8. The method of claim 6, further comprising:
   controlling the hydrogen production by heating the combination of the electro-activated carbon, aluminum and water to increase hydrogen production; and
   cooling or reducing the heat provided to the combination of the electro-activated carbon, aluminum and water to reduce hydrogen production.

9. The method of claim 6, further comprising:
   controlling the hydrogen production by adding amounts of one or more of the electro-activated carbon, aluminum and water to increase the hydrogen production, and removing amounts of one or more of the electro-activated carbon, aluminum and water to decrease the hydrogen production.

10. The method of claim 6, wherein the water comprises tap water, dirty water, high-calcium water, salt water, sea water, alkaline water or acidic water.

11. The method of claim 6, further comprising:
    mixing, burnishing or chopping the aluminum during hydrogen production.

12. A system for producing hydrogen, comprising:
    a vessel having a combination of electro-activated carbon, fuel and water, wherein the fuel is capable of tying up an OH group in a water molecule in a chemical reaction; and
    an apparatus for heating the vessel to produce a chemical reaction between the fuel and the water causing separation of the water molecule to produce hydrogen;
    wherein the fuel comprises one or more of lithium, sodium, potassium, rubidium, cesium, calcium, strontium, barium, barium oxide, aluminum, aluminum powder, aluminum granules and aluminum shavings.

13. The system of claim 12, further comprising:
    one or more mechanisms for mixing, burnishing or chopping the fuel during hydrogen production.

14. The system of claim 12, further comprising:
    one or more mechanisms to control the hydrogen production in the vessel to produce hydrogen on demand.

15. The system of claim 14, wherein the one or more mechanisms heat the combination of the electro-activated carbon, fuel and water to increase the hydrogen production, and cool or reduce the heat to the combination of the electro-activated carbon, fuel and water to decrease the hydrogen production.

16. The system of claim 15, wherein the one or more mechanisms heat the combination of the electro-activated carbon, fuel and water to a temperature range between approximately 150 degrees Fahrenheit to approximately 190 degrees Fahrenheit.

17. The system of claim 14, wherein the hydrogen production is controlled by adding amounts of one or more of the electro-activated carbon, fuel and water to increase the hydrogen production, and removing amounts of one or more of the electro-activated carbon, fuel and water to decrease the hydrogen production.

18. The system of claim 12, wherein the water comprises tap water, dirty water, high-calcium water, salt water, sea water, alkaline water or acidic water.

* * * * *